United States Patent
Clayton et al.

(10) Patent No.: US 11,587,028 B2
(45) Date of Patent: Feb. 21, 2023

(54) COMPUTER SYSTEM FOR OPTIMIZING GARMENT INVENTORY OF RETAILER BASED ON SHAPES OF USERS

(71) Applicant: Savitude, Inc., Palo Alto, CA (US)

(72) Inventors: Nicholas Daniel Clayton, Ypsilanti, MI (US); Camilla Marie Olson, Palo Alto, CA (US); Beth Blecherman, Palo Alto, CA (US)

(73) Assignee: Savitude, Inc., Palo Alto, CA (US)

( * ) Notice: Subject to any disclaimer, the term of this patent is extended or adjusted under 35 U.S.C. 154(b) by 244 days.

(21) Appl. No.: 16/754,742

(22) PCT Filed: Oct. 8, 2018

(86) PCT No.: PCT/US2018/054873
§ 371 (c)(1),
(2) Date: Apr. 8, 2020

(87) PCT Pub. No.: WO2019/074852
PCT Pub. Date: Apr. 18, 2019

(65) Prior Publication Data
US 2020/0320468 A1     Oct. 8, 2020

Related U.S. Application Data

(60) Provisional application No. 62/570,039, filed on Oct. 9, 2017.

(51) Int. Cl.
| | |
|---|---|
| *G06Q 10/08* | (2012.01) |
| *G06Q 10/087* | (2023.01) |
| *G06F 16/23* | (2019.01) |
| *G06N 20/00* | (2019.01) |
| *G06N 5/04* | (2023.01) |
| *G06Q 30/0203* | (2023.01) |
| *G06Q 30/0204* | (2023.01) |
| *G06Q 30/0601* | (2023.01) |

(52) U.S. Cl.
CPC ....... *G06Q 10/087* (2013.01); *G06F 16/2379* (2019.01); *G06N 5/04* (2013.01);
(Continued)

(58) Field of Classification Search
CPC ............... G06Q 30/02; G06Q 30/0203; G06Q 30/0205; G06Q 30/0605; G06Q 30/0631;
(Continued)

(56) References Cited

U.S. PATENT DOCUMENTS

| | | |
|---|---|---|
| 9,639,880 B2 | 5/2017 | Dalal |
| 2009/0019053 A1 | 1/2009 | Burgess |
| 2011/0184832 A1* | 7/2011 | Wannier ............ G06Q 30/0603 705/26.7 |

(Continued)

FOREIGN PATENT DOCUMENTS

| | | |
|---|---|---|
| WO | 2017/124568 A1 | 7/2017 |
| WO | WO-2017124568 A1 | 7/2017 |

OTHER PUBLICATIONS

Zhou et al., Design and Implementation of an RFID-Based Customer shopping Behavior Mining System, Aug. 1, 2017, IEEE/ACM Transactions on Networking (vol. 25, Issue: 4, pp. 2405-2418 (Year: 2017).*

(Continued)

*Primary Examiner* — Robert D Rines

(57) ABSTRACT

A computing system comprises a database of garments in a retailers inventory, a database of users, a database of garments not in inventory, and a database of mappings, wherein a mapping maps one or more users of the database of users to one or more garments of the database of garments and wherein each mapping includes a weight for its corresponding user-garment pair.

1 Claim, 5 Drawing Sheets

(52) U.S. Cl.
CPC ......... *G06N 20/00* (2019.01); *G06Q 30/0203* (2013.01); *G06Q 30/0205* (2013.01); *G06Q 30/0605* (2013.01); *G06Q 30/0631* (2013.01)

(58) Field of Classification Search
CPC .............. G06Q 30/06; G06Q 30/0623; G06Q 30/0641; G06Q 30/0643; G06Q 10/00; G06Q 10/06; G06Q 10/087; G06Q 10/08; G06F 16/2379; G06N 5/04; G06N 20/00
See application file for complete search history.

(56) References Cited

U.S. PATENT DOCUMENTS

| | | |
|---|---|---|
| 2015/0186419 A1 | 7/2015 | Agrawal |
| 2016/0092956 A1 | 3/2016 | Su |
| 2017/0186066 A1 | 6/2017 | Brunch |
| 2018/0025365 A1* | 1/2018 | Wilkinson ............. G06Q 30/06 705/7.29 |
| 2018/0330423 A1 | 11/2018 | Clayton |
| 2019/0073335 A1* | 3/2019 | Foley ................. G06Q 30/0601 |
| 2021/0279785 A1* | 9/2021 | Nagy ................. G06Q 30/0627 |

OTHER PUBLICATIONS

International Search Report and Written Opinion dated Dec. 4, 2018, in International Patent Application No. PCT/US2018/054873, filed Oct. 8, 2018, 12 pages.
Extended European Search Report for corresponding Application No. 18866470.0, dated Mar. 2, 2021; 11 pages.

* cited by examiner

Which of these images best represents your shoulders?

Which of these images best represents your body proportion (torso)?

Type/select your height.

Nothing selected ▼

COMPUTER SYSTEM FOR OPTIMIZING GARMENT INVENTORY OF RETAILER BASED ON SHAPES OF USERS

CROSS-REFERENCE TO RELATED APPLICATIONS

This application is a 35 U.S.C. § 371 filing of International Patent Application PCT/US2018/054873, filed Oct. 8, 2018, entitled "Computer System for Optimizing Garment Inventory of Retailer Based on Shapes of Users" and claims the benefit of, and is a non-provisional of, U.S. Provisional Patent Application No. 62/570,039, filed Oct. 9, 2017, entitled "Computer System for Optimizing Garment Inventory of Retailer Based on Shapes of Users" the disclosures of which are incorporated herein by reference in their entirety.

FIELD OF THE INVENTION

The present disclosure generally relates to computer database systems. The disclosure relates more particularly to apparatus and techniques for performing filtering and searching garment databases for matching users with garments and determining garment inventory levels.

BACKGROUND

The present disclosure relates to matching user records in a database with garment records in a garment database, but might generalize to other domains wherein databases with large numbers of records need to be filtered, sorted and matched in an efficient manner. Such a system might find use as a backend server or service for an online service that identifies for retailers suitable garments or accessories where the number of possible garments or accessories is large enough that filtering is required in order to make the server or service useful. The utility of a server or service might be determined based on how well it filters data, how long it takes to compute a response for a user, and other requirements.

SUMMARY

In a server system, recommendations for garments to be added to retailer inventories are determined. A method might include receiving user questionnaire data including an association with a retailer and location data, generating user shape data and user proportion data based on the user questionnaire data and storing the user shape data and user proportion data in a user database, associating a user with a retail location based on at least one of user location or user demographics, filtering the user data based on location or retailer data to generate a user pool for a retail location, receiving garment shape data, garment proportion data, and a garment ID for each garment in a plurality of garments forming a possible inventory set and storing the garment shape data, the garment proportion data, and the garment ID in a garment database. For each user in the user pool and each garment ID in the possible inventory set, the server system might generate a garment-user score based on how well each garment shape and proportion match each user shape and proportion, aggregate the garment-user scores for each garment across all users, thus generating an aggregate garment score with respect to all users in the user pool, and select a set of garments having an aggregate garment score above a certain threshold.

FIGURES

DETAILED DESCRIPTION

Figure 1:
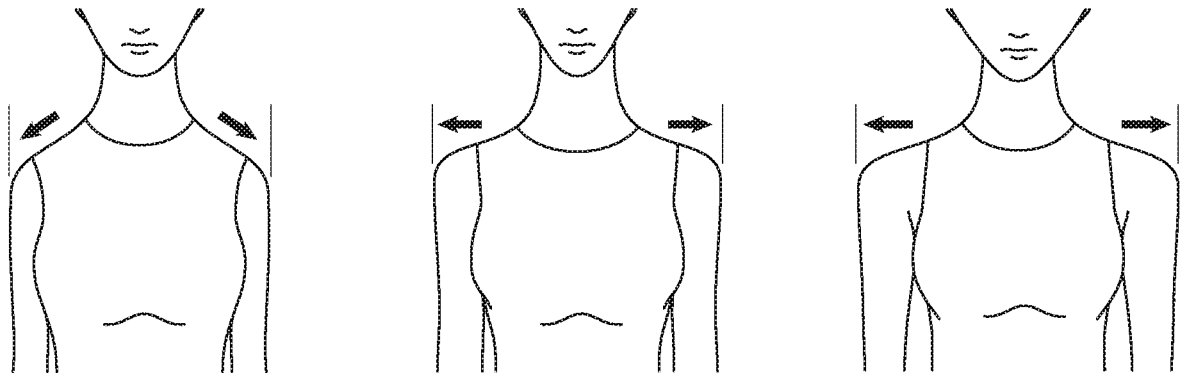
FIG. 1 illustrates some examples of questions and how they are presented to the user.
Figure 1:
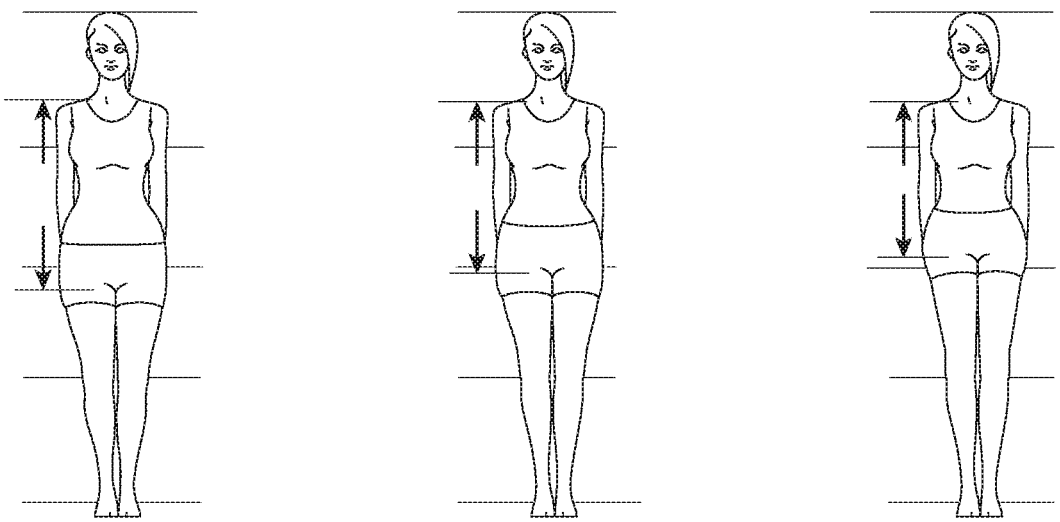

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In one embodiment, a server maintains several databases, or provides access to them, and responds to queries from client devices and systems. A client device might be a computer with a browser and an Internet connection that a user might use to access information available from the server. Herein, "user" refers to a person, or an automated system behaving as a person, who interacts with the servers and services to perform some operation.

The server also includes program code to process data from the client devices and systems and from various databases to implement program functionality. Some such functionality includes maintaining a database of users, maintaining a database of garments, maintaining a database of retailers, maintaining a database of inventory, maintaining a mapping database, and maintaining a database of demographic data, maintaining an inventory score for all garments in inventory. Maintenance actions might include updating records, reading records, writing records, deleting records and backup up data. The server might also include program code to filter and present garments from garment records selected per a selection process, where presenting might be sending web pages or information to a client device, and program code to update and maintain the databases.

Among the data structures provided, such as in the databases mentioned, included is a data structure that maps demographics and distributions user body shape and user proportion data with associated locations for those users. This data structure provides for simple processing by other modules to determine supply chain and other actions for location-based retailers. For example, using the data structure, a retail outlet operated in one urban center could determine from the data structure that users in that city tend to have broader shoulders or be generally taller, or have a higher ratio of hourglass bodies. This could make supply chain processing faster, simpler, and/or more reliable.

The database of users might comprise a user record per user that contains details of the user. In some embodiments, the user records contain questionnaire data or shape data derived from questionnaires. In a specific example, the data includes data characterizing each user as having one of nine body shape enumerated values and one of three options for proportions of shoulders, torso, height and weight.

The database of garments might comprise data about garments. A garment might include, in context, items that are worn by persons, but which should be understood to extend to accessories and other items that might be worn or carried by persons, with a garment record per garment that contains qualitative details of the garment identified in that garment record. In some embodiments, the garment record may contain binned quantitative data.

The database of retailers might comprise one record per retailer that contains details about the retailer. In one embodiment, the details include the location or locations of the retailer. In another embodiment, each location of a retailer has its own entry and in ID to identify to which retailer it belongs. Demographic data may be associated with locations or retailers.

The database of inventory might, in one embodiment, have inventory specific to one location. In another embodiment, the database contains the combined inventory of all locations. The inventory may also include items that may possibly be added to inventory but are not actually in physical inventory at a location. Records might include an inventory score for some or all of the garments in the inventory.

The mapping database might comprise a plurality of mapping records wherein a mapping record includes data to (1) associate a user or multiple users with (2) a garment or multiple garments, and (3) a weight for the user-garment association to which the mapping record refers.

The database of demographic data might include data based on demographic data from questionnaires or data from outside sources.

User Database

A user database is provided. A user record might include contact information for the user, but might also include geographic location, age, or profession. In addition to quantitative data about the user, the user record might also include relative data and qualitative data. This data might be supplied by the user, but might be obtain in other ways as well.

Relative data might indicate relationships between other data. For example, a ratio between two numbers might be relative data. For example, ratio of torso to leg inseam would be relative data. The relative data and quantitative data (and maybe also the qualitative data) might be represented at full resolution, but also or instead might be represented by "binned" data representing less resolution or more grouping of values. As an example, a user record might include height data (e.g., 175 cm, 5' 4", 6' 2.5") and/or binned height (e.g., A through E, where A is for less than 4' 6", B is for 4' 6" to 5' 3", C is for 5' 3" to 5' 10", D is for 5' 10" to 6' 3" and E is for greater than 6' 3").

Examples of data that might be included in a user record are the user's body shape, perhaps selected from among a standardized set of nine body shapes. In the general case, body shape is an enumerated value and other enumerated values might be present in a user record.

The data can be obtained from the user in a number of ways. Quantitative data might be obtained by asking the user to make body measurements, having the user input those into their client device (such as a smartphone, tablet, laptop, computer, etc.) and the server record those into the user record. The user may also answer questions in a store provided device, such as a kiosk or tablet. Other types of data might similarly be obtained.

Another method of data collection, such as for relative data and qualitative data, is to show the user a series of images and ask them to select the images that are most like them. For example, a user might be shown several pictures of persons with different torso/inseam ratios and asked to pick one or more that the user feels is an image of a person having the same relative data item as the user. This can provide for more robust data collection, as a user might not know their inseam and torso length, or be able to measure it accurately and correctly, but they might be able to more easily look at a set of images representative of each bin for torso/inseam ratio and pick the one or more images from the set of images that most resembles the user. By binning descriptors, the server can more easily make reasonable judgments about the user without having to create an unreasonable number of entries. Binning also allows users to be grouped into their relevant demographics more meaningfully.

Yet another method is to have the server send the client device a display of a set of questions that are asked of the user. For example, a website with radio buttons and other input fields might be presented to the user to obtain the user's answers. The user might be presented with a main image and auxiliary images and a set of radio buttons for the user to select "more like this", "some like this", and "less like this" so that the user sees auxiliary images that fit those criteria. The user can select among the radio buttons and the auxiliary images change. The user can select an auxiliary image to be the main image.

In an example process, a server sends a user's browser a page that asks preliminary questions, such as body shape, size and proportion questions. Upon receiving the user's response, the server generates and sends the browser a page where the user can select a clothing type (dress, pants, jackets, sweaters, etc.). Upon receiving a clothing type indicator, the server can serve a page to the browser that has a main image, auxiliary images and radio buttons. The server might select the main image based on the user's responses up to that time, as well as selecting the auxiliary images. The web page presented to the user's browser might have a set of radio buttons for the user to select "more like this", "some like this", and "less like this" as to each of a plurality of attributes, such as neckline, silhouette, length, sleeve, color, and the like. As the user selects radio buttons, the server might refresh the page with different auxiliary images to better fit the user's indicated preferences.

The user might click on an auxiliary image and the server would then make that the main image and the server can repeat the process. The user can then select the option to purchase the item shown in the main image, or get more information about it.

A server system that includes programming modules might be used to implement these features. The server system might include databases as described herein, a network interface to interface with user devices, and other components. The software executed by the server system might include software that performs a method for generating a recommendation for a garment to be added to a retailer inventory.

The method might involve receiving user questionnaire data including an association with a retailer and location data, or other methods of receiving user data. The server system might then generate user shape data and user proportion data based on the user data and store the user shape data and user proportion data in a user database. The server system can associate a user with a retail location based on at least one of user location or user demographics and filter the user data based on location or retailer data to generate a user pool for a retail location. By receiving garment shape data, garment proportion data, and a garment ID for each garment in a plurality of garments forming a possible inventory set and storing the garment shape data, the garment proportion data, and the garment ID in a garment database, the server system can, for each user in the user pool and each garment ID in the possible inventory set, generate a garment-user score based on how well each garment shape and proportion match each user shape and proportion and aggregate the garment-user scores for each garment across all users, thus generating an aggregate garment score with respect to all users in the user pool. From this, the server system can select a set of garments having an aggregate garment score above a certain threshold as might be needed to generate customized interfaces such as web pages for the user.

The server system can generate a recommendation for a garment to be added to a retailer inventory by receiving user questionnaire data including an association with a retailer and location data, generating user shape data and user proportion data based on the user questionnaire data and storing the user shape data and user proportion data in a user database, receiving current inventory information about a retail location or a plurality of retail locations, the current inventory information comprising garment data, including, for each garment, garment shape, garment proportion, and garment ID, and storing the garment data in an inventory database, filtering users by location to create a filtered user subset using a filter is based on proximity to a retail location of the retailer, aggregating the filtered user subset to build a shape profile of the retailer location. For each user in the filtered user subset and each garment ID in the inventory database, the server system might generate a garment-user score based on how well the garment shape and garment proportion of each garment match the user shape data and user proportion data of each user in the filtered user subset, aggregate the garment-user scores for each user across all garments in the inventory database, thus generating an aggregate user score with respect to the inventory database.

The server system can then identify a set of underserved users having an aggregate user score below a threshold, receive garment shape data and garment proportion data for each garment in a plurality of garments forming a possible inventory set, each garment having a garment ID, and storing the garment shape data and garment proportion data in a garment database. For each user in the set of underserved users and each garment ID in the possible inventory set, the server system can generate a second garment-user score, form a potential garment-user score set, based on how well each garment shape and proportion matches each user shape and proportion in the set of underserved users, aggregate the second garment-user scores in the potential garment-user score set, and select garment IDs above a given threshold from the potential garment-user score set.

As described herein, a server system might perform a method for generating a recommendation for a garment to be added to a retailer inventory, the method comprising receiving demographic information about a population surrounding a retail location for which shape data is unavailable, receiving demographic information about populations surrounding other retail locations having shape data, selecting a retail location having similar demographic information and retrieving user shape data and user proportion data for each user associated with the retail location and storing the user shape data and the user proportion data in a user database, receiving, and storing in a garment database, garment shape data, garment proportion data, and a garment ID for each garment in a plurality of garments forming a possible inventory set, for each user in the user database and each garment ID in the garment database, generating a garment-user score based on how well the garment shape data and garment proportion data of each garment match the user shape data and the user proportion data of each user in the user database, aggregating the garment-user scores for each garment across all users, thus generating an aggregate garment score for each garment with respect to the user database, and selecting a set of garments having an aggregate garment score above a certain threshold.

FIG. 1 illustrates some examples of questions and how they are presented to the user. The user might be asked a series of qualitative questions (e.g., answering general questions or asking to identify features from examples), relative questions (e.g., selecting from images showing different ratios of particular measurements or inputting the user's ratio), and quantitative questions asking for particular values.

In response to the user's data input (measurements, answers to questions, etc.), the server can populate various fields of data for the user record. Qualitative fields might be more easily classifiable from the user perspective, as they do not require users to know specific measurements about themselves, or be less willing and able to provide that information. Many users might not have access to the requisite tools (such as a measuring tape) nor do many users know how to accurately apply those tools, even should they have access. Thus, instead of asking for features such as the circumference of their waist, the user might be asked about relative features such as the length of their legs compared with the length of their torso. While this feature could be found by measuring a user's inseam and torso and calculating the ratio, it might provide more complete and/or robust data to ask the user to select among images representing the various bins.

Much the same might be true of garments. While a vendor may have a variety of data about their garments, it is unlikely that they have in computer-readable form all of the data fields that the server system might need in order to implement the processes described herein. When the data fields for the features are qualitative and/or discrete, the server system can compare images of garments to models of each of the possible values and select the value that best matches the garment. Supervised image classification may be used to provide garment descriptor vectors for qualitative features. Quantitative features may be provided by the dimensions of the garment. One example of a dimension in a descriptor vector would be dress silhouettes for which there are 12 options (aline_trapeze, cocoon_bubble, column_shift, fit_flare, fitted_knit_stretch_bodycon, jumpsuit_romper, sheath, trumpet_fishtail, tulip, blouson_straight, blouson_flared) or neckline for which there are 15 options. Each descriptor vector contains, or represents, one or more such dimensions characterizing the garment.

Some set of the data items present in the user record can be considered descriptors and a plurality of descriptors can represent a descriptor vector for that user, i.e., where each field, column, etc. of the user record corresponds to a dimension and the value in that field, column, etc. of a given user record is the vector component value for that user record and that dimension. Table 1 illustrates an example of some descriptor dimensions that might be used.

TABLE 1

Descriptor Dimensions for User Records

| Name | Description |
| --- | --- |
| Body Shape | One of nine body shapes |
| Relative Torso Proportion | Torso length compared to legs, binned into three categories (e.g., average, shorter than average, longer than average) |
| Shoulder Width | Binned into three categories (broad, narrow, average) |
| Relative Weight | Binned into three categories |
| Height | Binned into three categories |

From the user record data, users can be grouped or filtered in different ways. From a user record, the server can filter users demographically, using conventional demographics, such as selecting based on geographic region as specified in the users' contact information fields. The server can also filter users demographically based on their descriptor vector. For example, a server might be compiling recommendations to send to the user's client device. To do so, the server searches the user database for user records having descriptor vectors that are similar to the user's descriptor vector. These descriptor vectors might be stored in a pre-computed fashion, or might be computed on-the-fly. For each pair of the user with another user in the user database, a "distance" between the two users' descriptor vectors might be calculated and a group determined of such users with distances within a threshold. In some embodiments, the user data provides shape data and proportion data.

Different approaches might be taken for calculating a "distance" between vectors. In one embodiment, a knowledge base serves as a reference for distance. For example, someone with narrow shoulders would be closer to someone with average shoulders than someone with broad shoulders.

From that group of "similar" users (with similarity determined by vector difference), the server considers a past purchase history of the group of users and scores purchased items based on the number of other users in the group who have history with that item as well as the type of interaction history those users have (e.g., purchased, liked, viewed, or other product interaction) to find items that would be shown to the user. The different items might be weighted based on the vector distances, so that another user with a more similar descriptor is given a higher weight than descriptors from less similar users.

For the descriptor vectors, the dimensions might all be highly relevant to the recommendations being made and the values binned into the most relevant categories, so that groupings are meaningful, while not eliminating users based on meaningless differences (such as being 5' 1" vs. 5' 2"). This is particularly helpful when making recommendations with smaller numbers of users.

In one embodiment, users are associated with a retailer. For example, if the user fills out a questionnaire at a retailer's location, the user may be associated with that retailer and that retailer's location. If the user is shopping online and fills out a questionnaire at a retailer's web site, the user may be associated with that retailer. If the user ships an item, the user's address may be used to associate the user with a retailer's nearest location.

The answers to the questions can be used to create shape data or proportion data of a user and aggregated to build a shape profile of various populations. The data may be aggregated at the level of a retailer's store location or across all of a retailer's locations. When aggregating the users (e.g., customers) by location, the location may be based on proximity to a store or warehouse. There could be a hard cutoff in distance or the user may be weighted by distance. This allows the retailer to build a shape profile of their customer base. In one embodiment, the customers may be weighted the same. In another embodiment, customers may be weighted depending on, for example, how much they spend at a retailer in a month, quarter, or year. They may be weighted by the time since a last purchase or a function that reduces the weight based on time since last purchase and takes into account purchase amount, e.g., a linear or exponential decay function multiplied by the purchase amount. The user data may also be aggregated by demographic factors such as ethnicity, age, etc. This data can be combined with other data to assist retailers in making inventory decisions about what garments to keep in inventory.

Garment Database

A garment database is provided, containing garment records. A garment record might include details of a particular garment, including quantitative data, relative data and qualitative data. This data might be supplied by a garment manufacturer, but might be obtained in other ways as well.

Examples of data that might be included in a garment record are the style, type, color, etc. Some data might be binned values, and qualitative enumerated values. A vendor may have a variety of data about their garments and may provide the necessary qualitative values for the garments they provide. Where the features are qualitative or binned into few groups, a reviewer might easily compare images of garments to models to designate the qualitative values for a garment. In this manner, supervised image classification can be used to populate the garment database and provide garment descriptor vectors, including garment shape and garment proportion. Some set of the data items present in the garment record can be considered descriptors and a plurality of descriptors can represent a descriptor vector for that garment.

In a specific example, a garment record for a dress contains several forms of identifiers, such as the vendor that sells garment dress, a title, a breakdown of the colors in the garment (e.g., it is 50% red and 50% blue, or it is 50% color #FF3214 and 50% color #12FF34), a link to a pdp for that garment as well as other metadata from the vendor (size availability, size grouping, price, etc.), a set of images of that garment, an estimate of the pose of people in those images, and classifications for silhouette, neckline, shoulder, waist-_location, bodice_treatment, skirt_length, top_pattern, bottom_pattern, finish, fabric_structure_upper, fabric_structure_bottom, sleeve and other metadata.

As with user records, garment records can be grouped or filtered in different ways, such as by using garment descriptor vectors. These descriptor vectors might be stored in a pre-computed fashion, or might be computed on-the-fly.

The garment database might have fields for shape, such as "a-line" and other shapes, and field for features, such as "v-neck" and other features. In general, a garment record in the garment database might represent a garment largely using qualitative fields. This may allow the garment record to be classifiable by an automated process. This qualitative data for garments can be combined with a supervised image classification process, by generating a descriptor vector for a garment that represents its visual classification. In some embodiments, the garment data provides shape data and proportion data.

Filtering the garments data for a user is useful. For one, filtering and searching the garment database might reduce the number of garments that the user needs to consider. Another useful feature is filtering out garments that can be determined, based on their data elements and data representing characteristics of the user, to likely be undesirable or a poor fit for that user.

The filtering might be performed based on the knowledgebase, a large database of rules that encapsulate statements such as "you cannot wear yellow with pink" or "V-neck garments will flatter broad shoulders". These rules can be represented with numeric weights stored in a data structure. E.g., a V-neck gets a score of 10 for broad shoulders, while a crew neck gets a score of −2.

Retailer and Retailer Inventory

A retailer inventory database, with location information, is provided. A retailer record might include the retailer's locations, and in turn location records might include the location. Retailers may have an inventory database, which is an inventory of all the garments the retailer carries. This inventory may also be broken down by location. Alternatively, the retailer may have a possible inventory, with all garments the retailer is contemplating stocking.

Mappings Database

The server maintains a model of users, garments, retailers, inventory, and mappings. User interactions (such as purchases, adding to a shopping cart, liking, viewings, or other product interactions) can be used to update a weighted model of generic user preference based on the users and garments' or other items' features. This weighted model might use linear regression or reinforcement learning. This weighted model can be applied in a weighted manner, with weights updated based on user behavior where a user with a particular trait interaction with a garment with a particular trait would increase the model's preference for that intersection of traits. The weights may correspond to the probability that a user has a particular feature and that a garment has a particular feature. Different interactions may be weighted the same or differently. For example, a purchase of a product may be more heavily weighted than adding a product to a cart. Updating the model based on garments and users allows the server to access the model in constant time to evaluate a particular user and item based on their features, even if neither the user nor the item has any purchase history. In some embodiments, the weights may be used to calculate the probability of a particular user interacting with a particular garment.

The user database, the garment database, and the mappings database can be used as a knowledge base that provides essentially a weighted map between users and garments. For a user-garment pair, there can be a weighted value. This weighted value might be based on fashion expert inputs. Each weighted value might be a numerical value, not necessarily an integer value, and also have values representing −infinity (never make this mapping) and +infinity (always make this mapping), where 0 represents a neutral weight.

Garments can be scored for each user based on the sum of the weights that apply to them. For a user, garments with a score above some threshold (such as neutral) or better score, can be shown to the user, while those scoring below the threshold are discarded. The mapping data might be updated based on user purchase data or garment interaction data. For example, interaction data may include purchases, adding a garment to a shopping cart, liking a garment, viewings of a garment, or other product interactions. Different types of interactions may be scored differently. With this scoring structure, filtering and other processes would have an advantage in that a particular pairing of user and garment can be evaluated in constant time, allowing a set of garments to be generated for a user in $O(n)$ time, where n is the number of garments, whereas other approaches typically run in $O(n*m)$ or worse time, where m is the number of users.

Other filtering methods might be content-based, collaborative and demographic filtering.

User-Garment Models

The system described herein can be programmed with software that processes user-garment data and generates, through a training process, user-garment models. A user-garment model can be stored following the training process and user-garment models can be used by other processes that try to predict outcomes based on the user-garment data. The models can be used alone or combined with a subject matter expert model. The model might be stored as a large set of weights that map from body-shape to design details (such as the shoulder-neckline comparison referenced above).

In one embodiment, a modelling system might perform regression or process a RANSAC model in a training process to generate the user-garment model used to predict which garments are most likely to cause user interaction (e.g., purchases, adding to a shopping cart, liking, viewings, or other product interactions), using matrices or a neural network. In this embodiment, the weights of the knowledge base (the user database, the garment database, and the mappings) are periodically optimized to best fit user actions, such as shoulder-neckline, sleeve-shoulder, etc.

This approach works both for predicting if a user will interact in a specific way with a garment, such as viewing additional details, add the garment to a shopping cart from the product page, purchase the garment, etc. At a more general level, the modelling system determines whether the user has an interest in the garment. This may be tested by presenting a question on a product page or presenting the user with a survey.

In an example where the model is being trained to predict a specific action such as adding a product to a shopping cart, only similar interactions may be used. A model that is usable by the modelling system and indicates that the user will be adding a garment to a shopping cart may only give weight to interactions where a garment was in fact added to a shopping cart. Alternatively, all interactions could be used, but weighted differently. Adding to a shopping cart might count for the highest weight, with purchasing adding less weight but still positive. Some interactions may be weighted negatively, such as a user momentarily viewing but quickly leaving a product page. Alternatively, such interactions may still be positive but slightly so.

The weights might be reflective of a difference in intent to buy. For example, if only 5% of people using the system add something to their cart, but 99% of the items in carts get bought, the highest information is gained when the user adds the item to their cart. Thus, the action of adding to cart can in some cases be a stronger positive indicator than the action of checking out. Of course, abandoning the item in the cart (or deleting it) would be a negative indicator, so the complete process of adding an item to cart and buying it would have a stronger positive effect that adding it to cart and not buying it.

In a more general case, a weight could be assigned to each type of interaction based on the significance of the interaction. For example, decreasing weights could be used for purchases, adding to a shopping cart, liking, and viewing. In predicting whether a particular shape of user likes a particular shape of garment, a purchase of a similarly shaped garment would be a strong positive indicator while a momentary view of a product page with no interaction would be a weak negative weight indicating the user did not like the shape corresponding to the garment shown. In other models, it may be a weakly positive form of interaction. In a simplified embodiment, all weights may be the same, regardless of how much product interaction there was.

Regardless of how the weights are derived, a weighted regression or weighted RANSAC may be used to find the best-fit model to predict user interaction. This enables retailers to present garments or products to users that have the best fit or possibly advise a user if other users having similar features to the user did not have a lot of interaction with the garment or product.

In instances where faster access to the data such as live or almost instantaneous access is desired, a moving average filter may be used. This model may also be useful if a less computationally complex model is desired. An exponentially weighted moving average filter may be less computationally expensive than other methods, such as the RANSAC or regression methods described above. The moving average filter may also respond to new trends more quickly. This may or may not be desirable, depending on how important it is to identify trends and how costly false positives are. Similar to the above embodiment, weights may be used for more or less significant interactions. For each user interaction with a product, all weights impacting the prediction of that interaction may be updated as shown in Equation 1.

$$\text{weight}_{new} = \text{weight}_{current} * \left(1 - \frac{\text{signficance\_val}}{N}\right) + \frac{\text{signficance\_val}}{N} * \text{sign} \quad \text{(Eqn. 1)}$$

In Equation 1, $\text{weight}_{new}$ is the new weight after the interaction, $\text{weight}_{current}$ is the weight before the interaction, significance_val is a number between 0 and 1 corresponding to strength of interaction, N determines the responsiveness to new data where larger N represents using a longer tail (less responsive to new data), and sign is positive unity (+1) or negative unity (−1) depending on the positivity or negativity of the interaction. For example, a purchase may have a higher significance value (for example, 0.9) than a page view (for example, 0.1). A return may have a negative value for sign. In some embodiments, a momentary page view followed by immediately leaving the page, indicating dislike of the product, may have a negative sign.

The values could be manually provided, but they are best calculated from the difference in intent to buy. So an action after which a user is 10% more likely to buy might have twice the weight of one where they are only 5% more likely to buy.

The modelling system might use regression, RANSAC, weighted moving average, or another technique to generate a model. An evaluator, such as a subject matter expert, may tune or evaluate the weights and other aspects of the model, such as by moving a weight from 3.0 to 2.5 or from 0 to −0.5 to qualitatively improve the recommendation results the user sees.

Browser Plug-In Embodiment

Aspects of the systems described herein might be implemented in the form of a server and browser plug-in combination. With such an approach, the browser plug-in can provide a method of curating a brand's assortment of products to make personalized recommendations to a shopper for what would look good on that shopper, with a module as a plug-in for use with an e-commerce website that does not otherwise provide such functionality.

The plug-in can use machine learning and knowledge-based systems, at the server or in part at the client computer running the plug-in, to generate personalized boutiques for each user based on their body shape and proportion.

The server might use quantitative data and machine learning to classify design details of a brand's assortment, thereby building a curated boutique of clothing that will flatter the shopper's body. The plug-in can prompt shoppers to complete a brief visual questionnaire to give the system information usable to sort the brand's inventory for the shopper.

The platform can also support a brand's product development, forecasting, and localization improvement. The platform can include other modules that use AI to visually search, find similar clothing by color, pattern, and even build a plethora of outfit combinations that can be assembled and automatically accessorized by occasion. Using this platform, retailers and retailer partners with e-commerce platforms can provide for online shopping integrating personalized discovery seamlessly, recommend optimal pieces and outfits for each user's body shape and proportion, generate coordinating accessories with filters to sort by occasion, colors, and patterns, and the like.

Server Processes

For each dimension of a garment descriptor, the server might maintain a classifier. Taking, for example, a descriptor of boots that has three possible values (ankle, calf, and high), an image classification process might be passed a set of images having known values, e.g., a set of images of ankle boots, a set of images of calf boots and a set of images of high boots. For each of these sets, a model of the type of image is created. In one embodiment, a model such as a convolutional neural network is created to discriminate between the possible values. When a new boot is added to the garment database, images of the new boot are evaluated according to the model and a value on that dimension is determined by the highest ranked option. As an example, a new boot may be evaluated according to models for ankle, calf, and high and the new boots' value on that dimension is determined by which model they best fit. This process can be applied to each dimension of the descriptor to generate a complete descriptor vector. Where descriptors are both qualitative and contain a finite set of discrete possibilities, a classifier can easily be used for each dimension.

A computer system implementing the server can manage large numbers of users and large numbers of garments while learning how to present the most promising garments from a garments database to users. This might be useful in the context of an online store, where users are able to find garments that work for them.

A user's height can be binned and the bin can be used for demographic filtering to perhaps provide a user with an indication of actions/behaviors of their subset of users, such as indicating that "other users in your bin/category bought or liked X." In addition to user's height, the demographic filtering can be done on other body descriptors, such as body shape.

The user's purchase history and the user's height bin/category can be used to select a subset of other users and present the first user with suggestions, or information about, purchases made by others in the selected subset and exclude purchases outside the selected subset. Other body descriptors can be used as well.

Demographic filtering might be used in the following manner. Consider if the server was tasked with the process of "pick out all the extra tall people and when they are shopping for products, show them this particular brand of suit, but for the petites, do not show them that brand of suit." This would be but one example of demographic filtering.

In a process supported by the server, user purchases are used to update a weighted model of generic user preference. This allows for modeling, in constant time, and evaluating a particular user and item, even where neither the user nor the item have any purchase history.

Supply Chain and Inventory Management

Using a retailer's customer data to aggregate shape information across the retailer's locations allows the retailer to analyze their current inventory and select garments that should be added to inventory to best serve the population around any particular location (e.g., a store or warehouse). In one embodiment, each of the possible values for body shape and proportion that are present in the population is scored against each item in inventory for that body shape. Items scored highly (above a threshold or in the top N scored items) for that particular body would be given a score based on the number of people in that population who have that particular body shape. Some subset of the highest scored items could then be chosen as the items to be added to inventory for that particular location. Quantity could be distributed based on the score, also, with higher quantities ordered for higher scoring items. In one embodiment, the subset chosen would be based on a cap on the number of SKUs that can be carried in inventory in the location instead of or in addition to a threshold value.

Where populations change over time, (i.e., winter in Florida), trend data in population shape could be utilized to predict best inventory for a particular location based not only on present population data but on the predicted population at the time the inventory would be on sale in the location. Past sales information could be combined with shape data to enhance the prediction.

In locations where insufficient shape data is available, demographics can be used to estimate shape data. Demographic data such as ethnicity, age, etc. could be used to estimate shape data. Shape data for a location could also be based on shape profiles of similar retailers. Demographic data across a retailer could also be used to build a shape profile for the retailer's entire customer base, as opposed to just one retail location.

The shape data can be used to determine order quantity by aggregating the orders from all locations. Alternatively, items could be scored based on what portion of the population of the retailer's customer base they serve and quantities ordered based on that score.

The retailer's inventory can also be scored against either a location's population (e.g., by only including users within a certain distance of a location) or against a retailer's entire user base. An assessment of the population served can be generated based on the number of garments in the assortment that would score well for a particular body shape or proportions. This analysis of the shape profile that is being served by a retailer's inventory can be compared with the retailer's actual shape profile. In another embodiment, the shape profile can be compared with a target shape profile (e.g., the entire population) the retailer would like to serve in the future. Gaps will indicate that a particular body shape or proportion is over or under served. If it is found that there is a gap between the population being served and the real population of body shapes that are near the location or across all locations, the system can be used to identify specific garments that could be eliminated from or added to inventory. For example, if a body shape is over represented, it could be scored against all garments and then the remaining body shapes with the over-represented removed could also be scored, and garments having a high score against the over represented shape but a low score against the other body shapes could be removed. Similarly, for under-represented body shapes, garments have a high score against the under-represented body shape could be added to inventory. Further, attributes that are preferable to the underserved populations could be recommended to designers as attributes to be included in new designs to be added to inventory.

In one embodiment, particular attributes could be assigned a score based on their effect on the target population where attributes that would result in increased scores for larger portions of the population would be scored highly. These results could be used by designers to inform their decisions.

A suggested inventory could also be generated. One or more garments can be chosen that best fit the retailer's population based on the percentage of the retailer's population that this inventory would serve. This initial assortment may be thought of as a seed assortment. The initial assortment could then be refined through analysis of the underserved portion of the retailer's population by adding and removing garments to better serve the population. This process can be repeated until the served population of the assortment matches the target population within some tolerance. This final assortment could be used as a suggested inventory. In one embodiment, the initial seed assortment is the present inventory. Preference may be given to adding and removing the fewest number of garments to achieve serving the target population within the tolerance. In another embodiment, the seed assortment may be chosen to achieve a retailer's goals, such as to have a wide variety of silhouettes in stock. This seed assortment could be analyzed in a similar fashion as described above. The retailer may be constraints on the adding and removing garments, such as preferring particular colors or patterns of fabric—for example, a retailer may prefer solid color garments. The retailer may also include constraints such as allowing a maximum number of silhouettes in their assortments or a maximum number of different fabrics.

Figure 2:
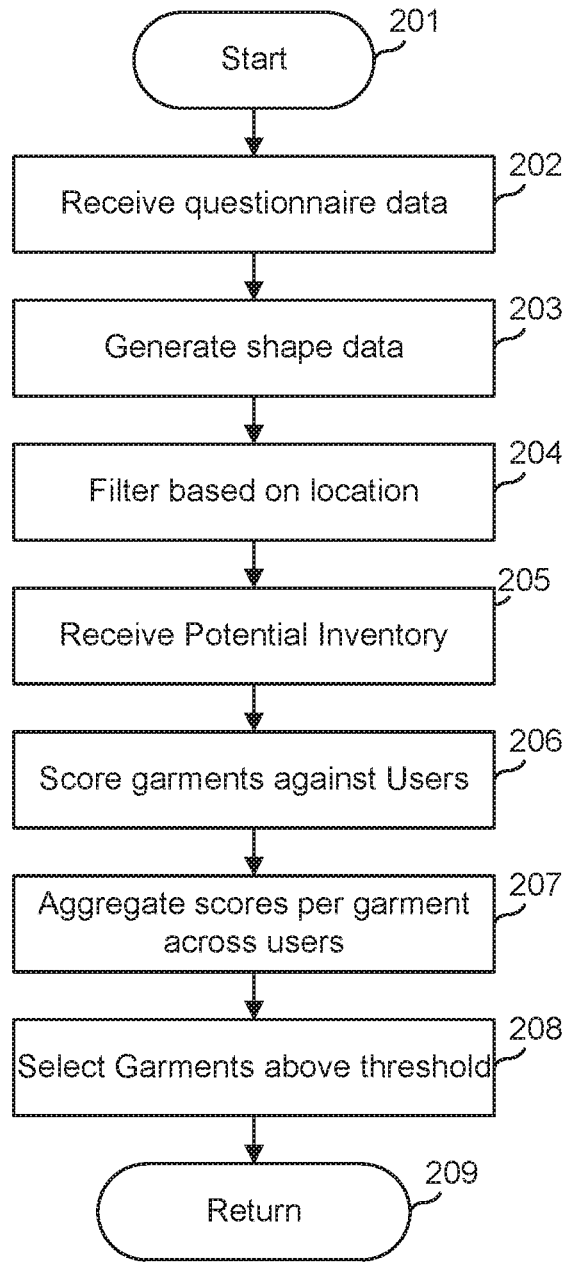
FIG. 2 illustrates a flow chart in accordance with one embodiment.

FIG. 2 shows an exemplary method for generating a recommendation for a garment to be added to inventory. The method starts at step 201. At step 202, a user questionnaire is received. The user may be associated with a particular retailer or location if the user fills out the questionnaire in a retail location or online at a website of the retailer. This data may be used to generate location data, such as from the user devices. At step 203, user shape data and user proportion data is generated based on the user questionnaire data. The generated user shape data and user proportion data may be stored in a user database.

At step 204, the user data may be filtered based on the user's location or proximity to a retail location or warehouse. The user may also be filtered based on association with a location or retailer. Filtering the user data based on location may be done based on other sources of location data, such as mailing lists. The user may also be associated with a retailer based on user demographics.

At step 205, a potential inventory of garments is received, including garment shape data, garment proportion data, and a garment ID for each garment. In some embodiments, a current inventory of garments may be received. The collection of garments form a possible inventory set. The garment data in is stored a garment database.

At step 206, a garment-user score based on how well each garment shape and proportion match the each user shape and proportion is generated for each user in the user pool and each garment ID in the current inventory database.

At step 207, the garment-user scores are aggregated for each garment across all users, thus generating an aggregate garment score with respect to the user population.

At step 208, a set of garments having an aggregate garment score above a certain threshold are selected.

At step 209, the method ends.

In other embodiments, a garment-user score is generated based on how well the garment shape and garment proportion match a user shape and user proportion. The garment-user scores are aggregated for each user across all garments to identify poorly served or underserved users. In one embodiment, users with aggregate user-garment scores below a certain threshold are added to an underserved user set. Garment shape data and garment proportion data for a set of garments in a proposed or possible inventory set may then be received, and the underserved users scored against the possible inventory set, to generate a set of potential garment-user score. The potential garment-user score may be aggregated for each garment across the underserved users to identify high scoring garments. Those garments above a threshold may be selected.

In another embodiment, demographic data may be used to identify locations with similar demographic data or retailers with similar demographic data. Shape data from locations or retailers with similar demographics may be used for locations or retailers that have little or no shape data.

Figure 3:
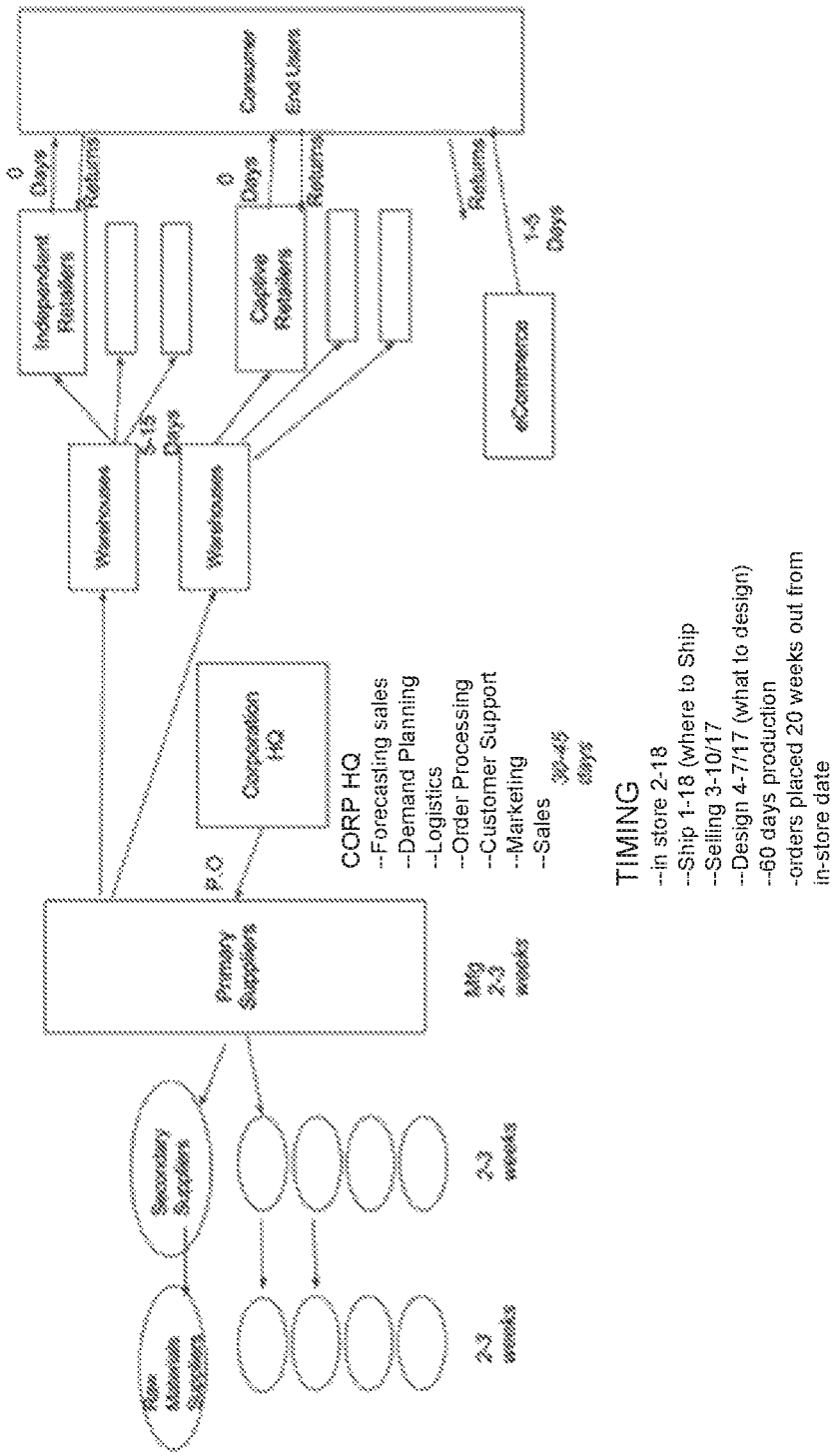
FIG. 3 illustrates a supply chain.

Uses of the above methods allow more precise forecasts with less critical lead times. Contributors to lead times are illustrated in FIG. 3. The process of generating new inventory may be repeated throughout the year, giving more accurate forecasts. This can help reduce risk in the forecast, and reduce inventory and scrap, which ultimately increases margins. The analysis described above may be used with historic trend analysis. Real-time trend analysis is particularly useful for localization, such as when making regional assessments by shape or age. Relying on demographic data alone may be less accurate. As an example, youth may choose style over shape.

The supply chain process might be managed using servers, databases, computers and algorithms that can be used to direct the flow of product through the supply chain, optimized by the shape and localization data.

It may take a season or months to accumulate enough data to build a correct assessment of body shapes. As discussed above, some geographic areas have mainly static populations, which may produce shape data more quickly than places with variable populations. For example, parts of Florida have migratory populations. Because there is only limited time to collect data on the different populations in a migratory market, it may take longer (e.g., years) to build shape data for the different seasons.

Refining the inventory may result in higher costs if more expensive garments are selected and may result in more SKUs being carried to cover underserved populations. This may decrease margin, but a more robust forecast should allow a retailer to move more product overall with decreased returns, improved inventory turnover, improved allocation, and decreased markdown due to unsold inventory. The better prediction should decrease supply chain expenses.

Example Hardware

Figure 4:
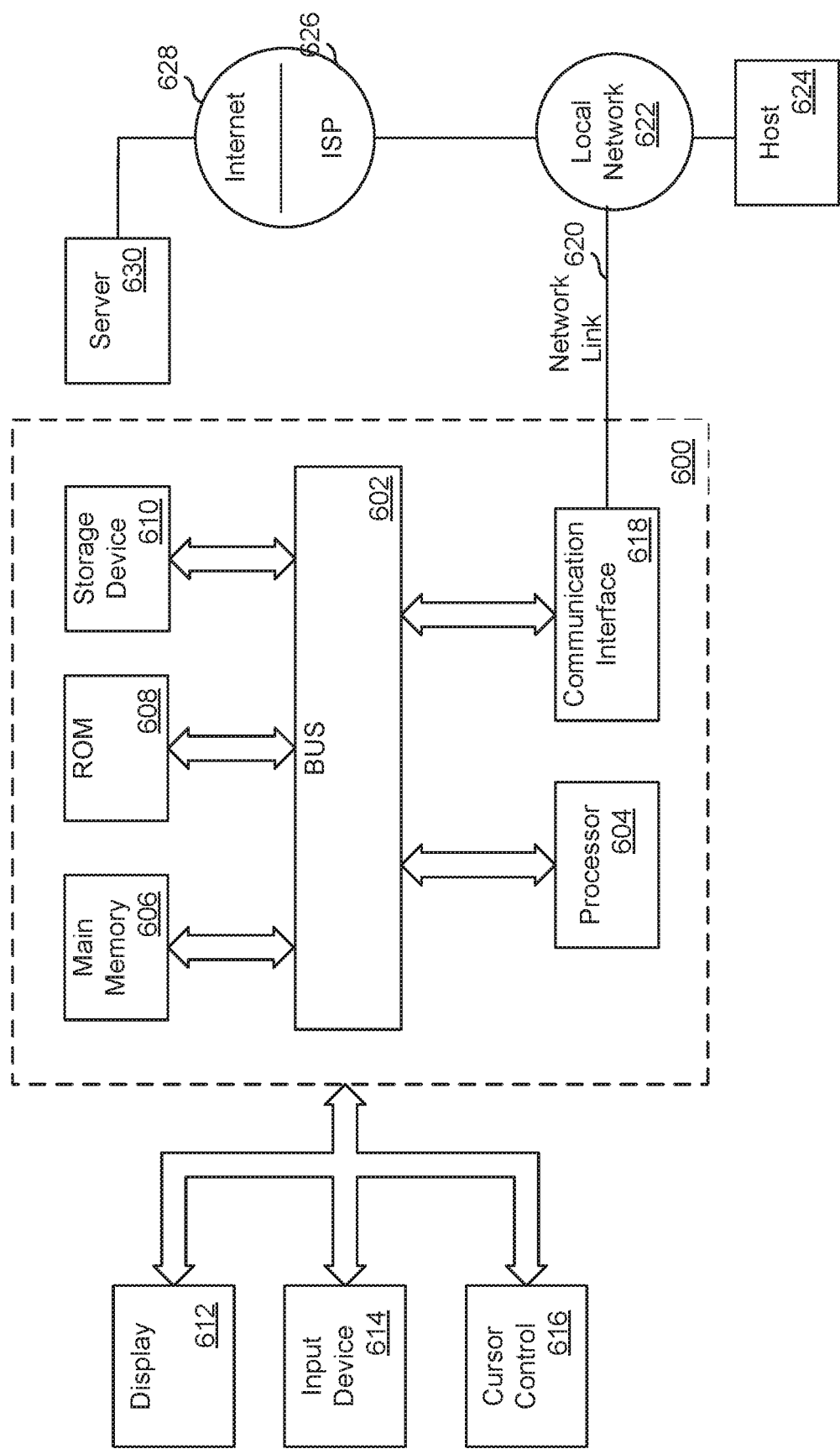
FIG. 4 illustrates an exemplary computer system, such as might be used in a server system.

According to one embodiment, the techniques described herein are implemented by one or generalized computing systems programmed to perform the techniques pursuant to program instructions in firmware, memory, other storage, or a combination, as shown in FIG. 4. Special-purpose computing devices may be used, such as desktop computer systems, portable computer systems, handheld devices, networking devices or any other device that incorporates hard-wired and/or program logic to implement the techniques.

For example, a computer system might include a bus or other communication mechanism for communicating information, and a processor coupled with the bus for processing information and the processor may be, for example, a general purpose microprocessor. The computer system also includes a main memory, such as a random access memory (RAM) or other dynamic storage device, coupled to the bus for storing information and instructions to be executed by the processor. The main memory also may be used for storing temporary variables or other intermediate information during execution of instructions to be executed by the processor. Such instructions, when stored in non-transitory storage media accessible to the processor, render the computer system into a special-purpose machine that is customized to perform the operations specified in the instructions.

The computer system further includes a read only memory (ROM) or other static storage device coupled to the bus for storing static information and instructions for the processor. A storage device, such as a magnetic disk or optical disk, is provided and coupled to the bus for storing information and instructions.

The computer system may be coupled via the bus to a display, such as a computer monitor, for displaying information to a computer user. An input device, including alphanumeric and other keys, is coupled to the bus for communicating information and command selections to the processor. Another type of user input device is a cursor control device, such as a mouse, a trackball, or cursor direction keys for communicating direction information and command selections to the processor and for controlling cursor movement on the display. This input device typically has two degrees of freedom in two axes, a first axis (e.g., x) and a second axis (e.g., y), that allows the device to specify positions in a plane.

The computer system may implement the techniques described herein using customized hard-wired logic, one or more ASICs or FPGAs, firmware and/or program logic which in combination with the computer system causes or programs the computer system to be a special-purpose machine. According to one embodiment, the techniques herein are performed by the computer system in response to the processor executing one or more sequences of one or more instructions contained in the main memory. Such instructions may be read into the main memory from another storage medium, such as a storage device. Execution of the sequences of instructions contained in the main memory causes the processor to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as the storage device. Volatile media includes dynamic memory, such as the main memory. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus. Transmission media can also take the form of acoustic or light waves, such as those generated during radio-wave and infra-red data communications.

Various forms of media may be involved in carrying one or more sequences of one or more instructions to the processor for execution. For example, the instructions may initially be carried on a magnetic disk or solid state drive of a remote computer. The remote computer can load the instructions into its dynamic memory and send the instructions over a network connection. A modem or network interface local to the computer system can receive the data. The bus carries the data to the main memory, from which the processor retrieves and executes the instructions. The instructions received by the main memory may optionally be stored on the storage device either before or after execution by the processor.

The computer system also includes a communication interface coupled to the bus. The communication interface provides a two-way data communication coupling to a network link that is connected to a local network. For example, the communication interface may be an integrated services digital network (ISDN) card, cable modem, satellite modem, or a modem to provide a data communication connection to a corresponding type of telephone line. Wireless links may also be implemented. In any such implementation, the communication interface sends and receives electrical, electromagnetic or optical signals that carry digital data streams representing various types of information.

A network link typically provides data communication through one or more networks to other data devices. For example, the network link may provide a connection through a local network to a host computer or to data equipment. The local network may use electrical, electromagnetic or optical signals that carry digital data streams. The signals through the various networks and the signals on the network link and through the communication interface, which carry the digital data to and from the computer system, are example forms of transmission media.

The computer system can send messages and receive data, including program code, through the network(s), the network link and the communication interface. A server might transmit a requested code for an application program. The received code may be executed by the processor as it is received, and/or stored in the storage device, or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 5:
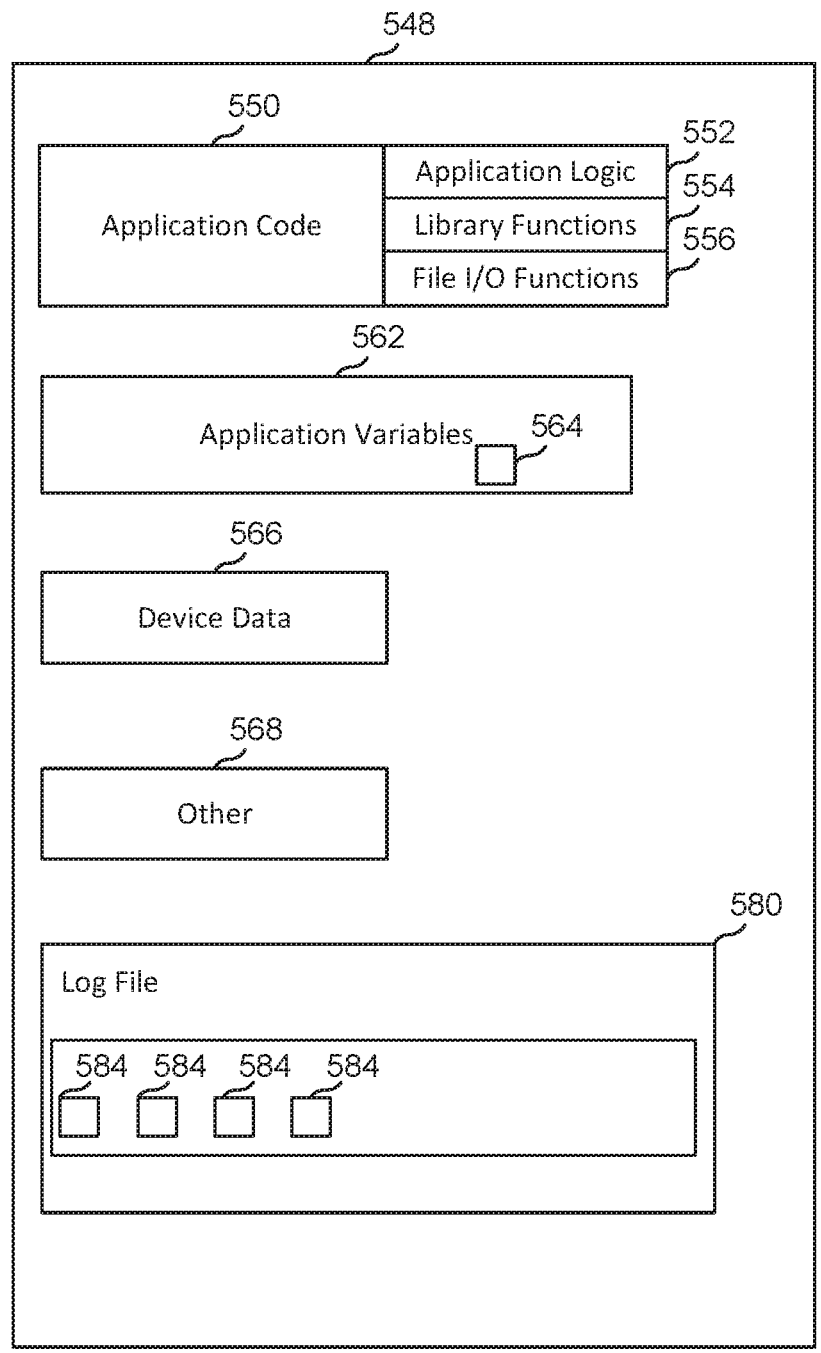
FIG. 5 illustrates an example of memory elements that might be used by a processor to implement elements of the embodiments described herein, such as within a portion of a server system.

FIG. 5 illustrates an example of memory elements that might be used by a processor to implement elements of the embodiments described herein, such as within a portion of a server system. For example, where a functional block is referenced, it might be implemented as program code stored in memory. FIG. 5 is a simplified functional block diagram of a storage device 548 having an application that can be accessed and executed by a processor in a computer system. The application can be one or more of the applications described herein, running on servers, clients or other platforms or devices and might represent memory of one of the clients and/or servers illustrated elsewhere. Storage device 548 can be one or more memory devices that can be accessed by a processor and storage device 548 can have stored thereon application code 550 that can be configured to store one or more processor readable instructions. The application code 550 can include application logic 552, library functions 554, and file I/O functions 556 associated with the application.

Storage device 548 can also include application variables 562 that can include one or more storage locations configured to receive input variables 564. The application variables 562 can include variables that are generated by the application or otherwise local to the application. The application variables 562 can be generated, for example, from data retrieved from an external source, such as a user or an external device or application. The processor can execute the application code 550 to generate the application variables 562 provided to storage device 548.

One or more memory locations can be configured to store device data 566. Device data 566 can include data that is sourced by an external source, such as a user or an external device. Device data 566 can include, for example, records being passed between servers prior to being transmitted or after being received. Other data 568 might also be supplied.

Storage device 548 can also include a log file 580 having one or more storage locations 584 configured to store results of the application or inputs provided to the application. For example, the log file 580 can be configured to store a history of actions.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A method for generating a recommendation for a garment to be added to a retailer inventory, the method comprising:
   receiving, by one or more processors, user questionnaire data including an association with a retailer and location data;
   generating, using the one or more processors, user shape data and user proportion data based on the user questionnaire data;
   storing, using the one or more processors, the user shape data and the user proportion data in a user database;
   receiving, by the one or more processors, current inventory information about a retail location or a plurality of retail locations,
      wherein the current inventory information comprises garment data, including, for each garment:
         garment shape,
         garment proportion, and
         garment ID;
   storing the garment data in an inventory database;
   filtering, using the one or more processors, users by location to create a filtered user subset using a filter that is based on proximity to a retail location of the retailer;
   generating, by the one or more processors, a first garment-user score for each user in the filtered user subset and each garment ID in the inventory database, wherein the one or more processors executes a first garment-user score model, the execution of the first garment-user score model comprises steps including:
      generating first mappings between the user shape data for each of the users in the filtered user subset to the garment shape data for each of the garment IDs in the inventory database; and
      generating second mappings between the user proportion data for each of the users in the filtered user subset of the user database to the garment proportion data for each of the garment IDs in the inventory database;
   wherein generating the first garment-user score for each user in the filtered user subset and each garment ID in the inventory database by executing the first garment-user score model further comprises:
      assigning a first weighted value to each of the first mappings to reflect how well the garment shape matches the user shape data;
      assigning a second weighted value to each of the second mappings to reflect how well the garment proportion matches the user proportion data;
      wherein each first garment-user score is associated with one user in the filtered user subset and one garment in the inventory database; and
      generating the first garment-user score for each user using the first and second weighted values;
   aggregating, using the one or more processors, the garment-user scores for each user across all garments in the inventory database, thus generating an aggregate user score with respect to the inventory database;
   identifying, using the one or more processors, a set of underserved users having an aggregate user score below a threshold;
   receiving, by the one or more processors, garment shape data and garment proportion data for each garment in a plurality of garments forming a possible inventory set, each garment having a garment ID;
   storing the garment shape data and garment proportion data in a garment database;
   generating, by the one or more processors, a second garment-user score for each user in the set of underserved users and each garment ID in the possible inventory set, wherein the one or more processors executes a second garment-user score model, forming a potential garment-user score set, the execution of the second garment-user score model comprises steps including:
      generating third mappings between the user shape data for each of the users in the set of underserved users to the garment shape data for each of the garment IDs in the possible inventory set; and
      generating fourth mappings between the user proportion data for each of the users in the set of underserved users to the garment proportion data for each of the garment IDs in the possible inventory set;
   wherein generating the second garment-user score for each user in the set of underserved users and each garment ID in the possible inventory set by executing the second garment-user score model further comprises:
  assigning a third weighted value to each of the third mappings to reflect how well the garment shape matches the user shape data;
  assigning a fourth weighted value to each of the fourth mappings to reflect how well the garment proportion matches the user proportion data;
  wherein each second garment-user score is associated with one user in the set of underserved users and one garment in the possible inventory set;
  and
  generating the second garment-user score for each user in the set of underserved users using the third and fourth weighted values;
aggregating, using the one or more processors, the second garment-user scores in the potential garment-user score set; and
selecting, using the one or more processors, garment IDs above a given threshold from the potential garment-user score set.

\* \* \* \* \*